(12) United States Patent
Kummer et al.

(10) Patent No.: US 7,892,306 B2
(45) Date of Patent: Feb. 22, 2011

(54) MULTI-USE PERSONAL VENTILATION/FILTRATION SYSTEM

(75) Inventors: Joseph Kummer, Fayetteville, NY (US); Jimmie B. Allred, Skaneateles, NY (US)

(73) Assignee: Propulsive Wing, LLC, Elbridge, NY (US)

( * ) Notice: Subject to any disclaimer, the term of this patent is extended or adjusted under 35 U.S.C. 154(b) by 267 days.

(21) Appl. No.: 12/237,885

(22) Filed: Sep. 25, 2008

(65) Prior Publication Data

US 2009/0078120 A1 Mar. 26, 2009

Related U.S. Application Data

(60) Provisional application No. 60/975,377, filed on Sep. 26, 2007.

(51) Int. Cl.
*B01D 46/00* (2006.01)
(52) U.S. Cl. .......................... 55/356; 55/385.6; 55/467; 55/467.1; 55/471; 96/222; 96/417; 415/53.3; 417/313
(58) Field of Classification Search ................. 55/356, 55/385.6, 467, 467.1, 471, 473, 482; 96/222, 96/417; 417/313; 415/53.3, 53.1
See application file for complete search history.

(56) References Cited

U.S. PATENT DOCUMENTS

| 5,094,586 | A | 3/1992 | Takada et al. |
| 5,564,124 | A | 10/1996 | Elsherif et al. |
| 5,667,564 | A | 9/1997 | Weinberg |
| 5,861,127 | A | 1/1999 | Yeh |
| 6,910,961 | B2 | 6/2005 | Niu |
| 6,929,684 | B2 * | 8/2005 | Chang et al. ................... 96/226 |
| 7,463,487 | B2 * | 12/2008 | Kim ........................... 361/715 |
| 2004/0184949 | A1 | 9/2004 | McEllen |
| 2008/0281472 | A1 | 11/2008 | Podgorny et al. |

FOREIGN PATENT DOCUMENTS

WO 2006/094778 A1 9/2006

OTHER PUBLICATIONS

Wein Mini-Mate Air Supply Purifier. http://www.weinproducts.com. 1998.
Ionmax Personal Ionic Air Purifier, Andatech personal air purifier. http://www.andatech.com.au/catalog/personal-ionic-purifier-p-501. html. 2005.
Oreck XL Tabletop Air Purifier. http://www.oreck.com/air-purifiers/xl_air_purifier_tabletop_pro.cfm?tab=readmore. 2002.
Honeywell User Manual for Honeywell Model Series 120 Oscillating IFD Tower Air Purifier. 2005.
Faulkner, David et al., "Ventilation Efficiencies of Desk-Mounted Task/Ambient Conditioning Systems," Indoor Air, vol. 9, No. 4, 1999, pp. 273-281.

(Continued)

*Primary Examiner*—Robert A Hopkins
(74) *Attorney, Agent, or Firm*—Brown & Michaels, PC (57) ABSTRACT

A personal ventilation system uses a cross-flow fan and one or more filters, where the filter preferably has a cylindrical or elongated elliptical shape that at least partially surrounds the rotor of the cross-flow fan. The filters preferably remove particles, undesired gases, and micro-organisms.

23 Claims, 11 Drawing Sheets

OTHER PUBLICATIONS

Podgorny, Marek et al., "Open Web Services-based Indoor Climate Control System," Proceedings of Clima 2007 WellBeing Indoors. 2007.

Melikov et al., "Personalized Ventilation: Evaluation of Different Air Terminal Devices," Energy and Buildings, vol. 34, 2002, pp. 829-836.

Sideroff, Chris and Dang, Thong, "Computation of Transport in PME: I. Flow and Pollutant Transport," Strategically Targeted Research in Intelligent Built Environmental Systems, SAC Review, Aug. 2007.

Niu, Jianlei et al., "Experimental Study on a Chair-Based Personalized Ventilation System," Building and Environment, vol. 42, 2007, pp. 913-925.

Kato, Shinsuke and Yang, Jeong-Hoon, "Study on Inhaled Air Quality in a Personal Air-Conditioning Environment Using New Scales of Ventilation Efficiency," Building and Environment, vol. 43, 2008, pp. 494-507.

Muhic, Simon and Butala, Vincenc, "Effectiveness of Personal Ventilation System Using Relative Decrease of Tracer Gas in the First Minute Parameter," Energy and Buildings, vol. 38, 2006, pp. 534-542.

Gao, Naiping and Niu, Jianiei, "CFD Study on Micro-Environment Around Human Body and Personalized Ventilation," Building and Environment, vol. 39, 2004, pp. 795-805.*

Tainter, Nathan, Dannenhoffer, John, and Khalifa, H. Ezzat, "Persoanl Ventilation," SAC Review, Jul. 2006.*

Exhausto Personalized Ventilation, Personalized Ventilation: A Healthy Investment, Exhausto Brochure, Jun. 2008.

Alamio Personal Air Purifier. http://purifymyair.com/alamio-personal-air-purifier.htm. at least as early as Apr. 2004.

Honeywell HFD-217 and 219 Quietclean Tower Air Purifier. http://www.quietclear.com/ProductFeatures.aspx. at least as early as 2007.

Germ Guardian PS-100 Personal Air Purifier, http://www.germguardian.com/prod_persair_howitworks.asp. at least as early as Nov. 2007.

AirTamer Travel Air Purifier Model A-300. http://www.filterstream.com/us/indes.phpp=products&do=showdetail&id=18. at least as early as Oct. 2006.

* cited by examiner

MULTI-USE PERSONAL VENTILATION/FILTRATION SYSTEM

REFERENCE TO RELATED APPLICATIONS

This application claims one or more inventions which were disclosed in Provisional Application No. 60/975,377, filed Sep. 26, 2007, entitled "Multi-Use Personal Ventilation/Filtration System". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of ventilation systems. More particularly, the invention pertains to ventilation and filtration systems for personal use.

2. Description of Related Art

Allergens and other contaminants (e.g. pollen, mold, car exhaust, and smoke) in public places cause discomfort for many people. It is well established that poor quality of breathed air in the workplace results in reduced productivity at work. Air quality is also poor on airplanes, and travelers are often exposed to diseases from other passengers. Mold and toxins from cleaning products found in schools often cause problems with children, resulting in unhealthy learning environments due to heightened allergic sensitivity. In hospitals, airborne diseases can cause patients to develop nosocomial infections like tuberculosis, varicella, and rubeola.

With the problem of poor indoor air quality at an epidemic level, to the point that there is now such a thing as "Sick Building Syndrome," and with people spending the vast majority of their time inside, it is essential to find solutions that meet the needs of the millions of people who suffer due to transmitted diseases and allergic reactions to airborne pollutants. Several companies currently offer personal air ventilation and room air purifications devices, ranging from small units that one wears around the neck (e.g. Wein Personal Air Purifier and Ionmax Personal Ionic Air Purifier), to tabletop models (e.g. Oreck XL Tabletop Air Purifier), to free-standing floor models that filter the air for an entire room (e.g. Oreck XL Tower Air Purifier, Sharper Image Ionic Breeze, Hamilton Beach TrueAir HEPA air purifier).

Conventional air purification devices perform well to reduce the ambient levels of contaminants in a room; however, they fail to adequately filter the air as it travels from the floor to the mouth. As a result, significant contaminants, both particulate and gaseous, have an opportunity to enter the airstream in this region, greatly reducing the perceived effect of the room air purifier. Introduction of contaminants into the thermal plume include resuspension of particulate matter from the floor (particularly from dirty carpeting), volatile organic compound outgassing from carpets, furniture, and equipment, as well as ambient levels of both particles and volatile organic compounds. Thermal plume, as defined herein, is a plume generated by gas rising from above a heat source because warm gas is less dense than the surrounding cooler gas.

To improve the indoor air quality, air filters have been widely used in building HVAC systems, portable room air cleaners and even automobiles. Particles are essentially the major target of these filters. Recently, with the increase in concern over other indoor pollutants including, but not limited to, volatile organic compounds, bacteria and other micro-organisms, as well as other undesired gases and airborne pollutants, composite/combination filters have been developed that are aimed to remove pollutants other than particles.

There remains a gap in filtration systems when considering the needs of the individual, especially in terms of the personal environment. Large, bulky, floor models are effective in general removal of pollutants from a room; however, they tend to be noisy, expensive, and consume large amounts of power. At the other end of the spectrum, those that are wearable (i.e. the true personal ventilation unit for the individual), do not work well, and many release ozone as a bi-product of the filtration process, which is then breathed in by the user. In light of this, there is a need in the art for improved personal ventilation systems.

SUMMARY OF THE INVENTION

A personal ventilation system uses a cross-flow fan and one or more filters, where the filter preferably has a cylindrical or elongated elliptical shape that at least partially surrounds the rotor of the cross-flow fan. The filters preferably remove particles, undesired gases, and micro-organisms.

DETAILED DESCRIPTION OF THE INVENTION

The invention is a compact, quiet, low power personal ventilation system capable of delivering filtered air to the user. A personal device, as defined herein, is a device that ventilates air for human or animal consumption.

A fan, as defined herein, is a device that accelerates air movement using impellers or blades rotating around an axis thereby directing air at an increased pressure.

Figure 3:
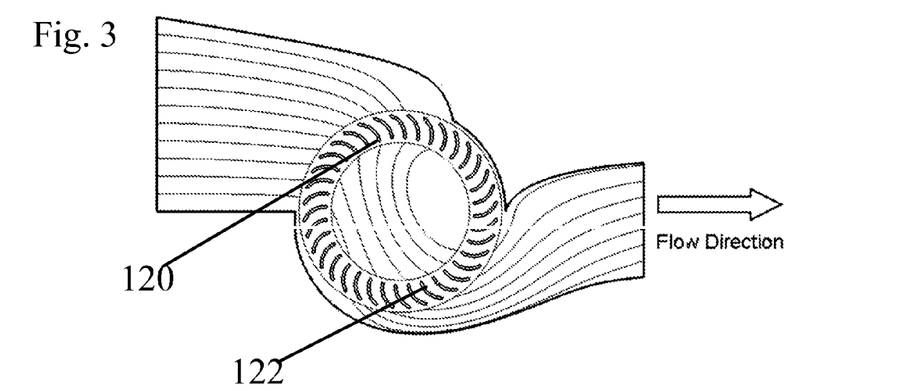
FIG. 3 shows streamlines within a cross-flow fan generated from a 2D unsteady CFD simulation.
Figure 4A:
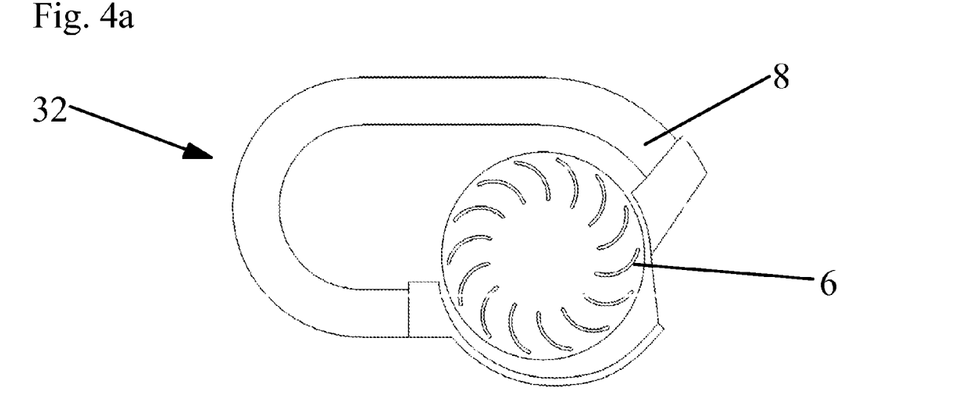
FIG. 4a shows a diagram of a ventilation device of the present invention.

Results from an unsteady 2D CFD simulation are shown in FIG. 3, and clearly show the radial path the flow takes. The ventilation device preferably uses a cross-flow fan, as shown in FIG. 4a. A 2-stage machine, the flow passes through the blades twice at 120 and 122, resulting in both high flow rate and a rise in pressure. By utilizing a "water-bottle" shaped blower unit, the shape of the fan and flow path create a compact, efficient device for personal ventilation use.

Solidworks CAD and Starccm+CFD software packages were used to simulate the personal ventilation device. In particular, using a "black-box" approach to simulate the personal ventilation device significantly reduced the meshing requirements and time to converge compared with a full unsteady simulation including the rotating fan. This permitted parametric studies on the flow external to the personal ventilation device.

These experiments looked at the flow around a simulated person working in an office. The personal ventilation device was included in the simulations. It was attached to the front of the laptop computer in order to draw in flow from the thermal plume, filter it, and exhaust the filtered air back toward the person in an effort to constitute as large of a portion of the breathed air as possible. The full personal ventilation device, including internal flow path and fan, was replaced with a simple inlet and outlet (i.e. only inlet and outlet boundary conditions were specified). By doing this, the grid count was reduced considerably. In addition, whereas an unsteady simulation is necessary when a rotating fan is present, for the case with a "black-box" personal ventilation device, the simulation becomes steady, thus reducing time to convergence.

Multiple sets of conditions were simulated, including having the personal ventilation device both off and on for the following outlet cases: a horizontal exit jet (0 degree case), 30° exit jet incline (measured from the horizontal), and 45° exit jet. For each outlet angle setting, the exit flow was simulated at a velocity of 0.5 m/s and 1.0 m/s. Grid clustering was present near the person, laptop computer, and in the proximity of the personal ventilation device in order to adequately capture the exhaust jet.

Simulation setup included setting the surface temperature for both the person and computer, as well as the inlet and outlet boundary conditions for the personal ventilation device. With the personal ventilation device off, the simulations clearly showed the rising thermal plumes of the simulated person and laptop computer. Of particular note is the region just below the table and between the table and person. It is this air that travels up to the breathing zone. In order to effectively mitigate contaminants from the air that the person is breathing, this air must be filtered. The data confirmed that the majority of the breathed air originates from the floor. It travels up the person's lap, torso, and eventually passes their face. With the personal ventilation device turned off, a large portion of the flow actually passes directly over the personal ventilation unit when located at the front of the desk. This is of particular relevance, since it means that, in order to provide filtered air to the user, the natural flow path of the air will not need to be altered, reducing the necessary energy input considerably when compared to a system that aims to drastically change the flow patterns near the person.

The flow entering the breathing zone originates near the floor and is significantly influenced by the individual's thermal plume. Placing the personal ventilation device in the natural flow path of this buoyant air, taking it in and filtering it, and then exhausting the air back toward the individual results in an efficient means to deliver clean air without any external air source (for example, a central air supply). There is an optimum combination of outlet flow angle and outlet velocity for delivery of the filtered air to the breathing zone. If the angle is set too low and velocity too high, the momentum in the flow carries it through the thermal plume and past the person. By comparison, at a high angle and low velocity the air is unable to penetrate the thermal plume and instead is convected upward before reaching the face. A preferred range for delivery of fresh air to the individual's breathing zone is a personal ventilation outlet air velocity between 0.5 m/s and 1.0 m/s and exhaust angle between 30 and 45 degrees from horizontal.

A primary concept in the personal ventilation/filtration device of the present invention utilizes the natural convection caused as a result of the buoyant flow near a person. Two good examples of this are a person sitting at a desk in an office or on an airplane. In these environments, the ambient air temperature is typically much lower than the temperature of the individual's skin. As a result, the air near a person is warmed, and subsequently begins to rise due to buoyancy effects. After only a few minutes, a stable column of vertically rising air forms, termed the human thermal plume.

Figure 1:
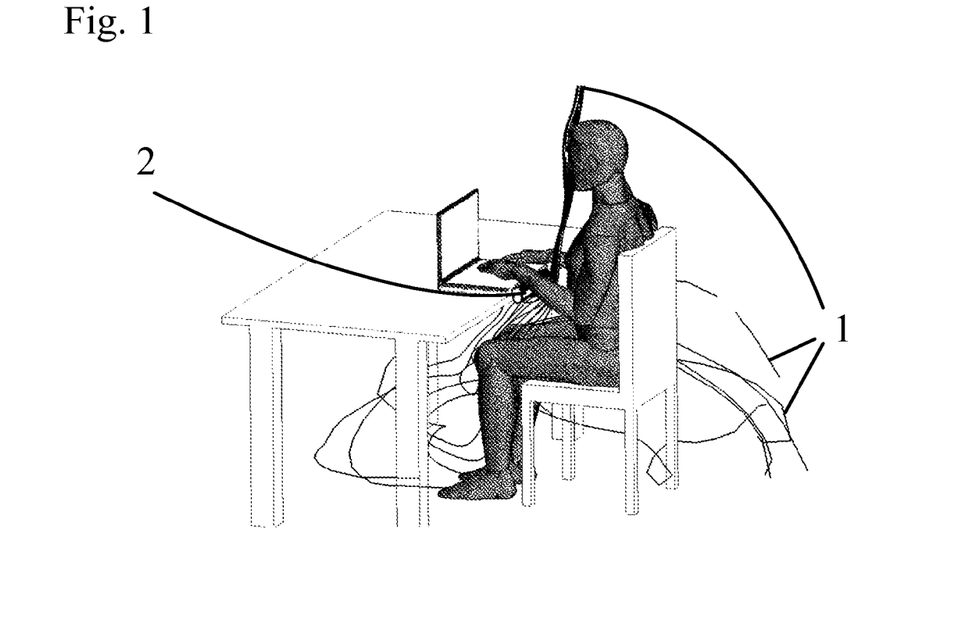
FIG. 1 shows streamlines around a person working at a desk.

FIG. 1 shows a person working at a desk and the representative air streamlines 1, or lines of thermal plume. Of particular importance to the present invention is the fact that the air passing the individual's face (i.e. the breathed air), does not come from in front of the person (i.e. from the room in general), but instead originates at the floor near the person's feet, travels up their lap, past their torso, and to the mouth.

Figure 2A:
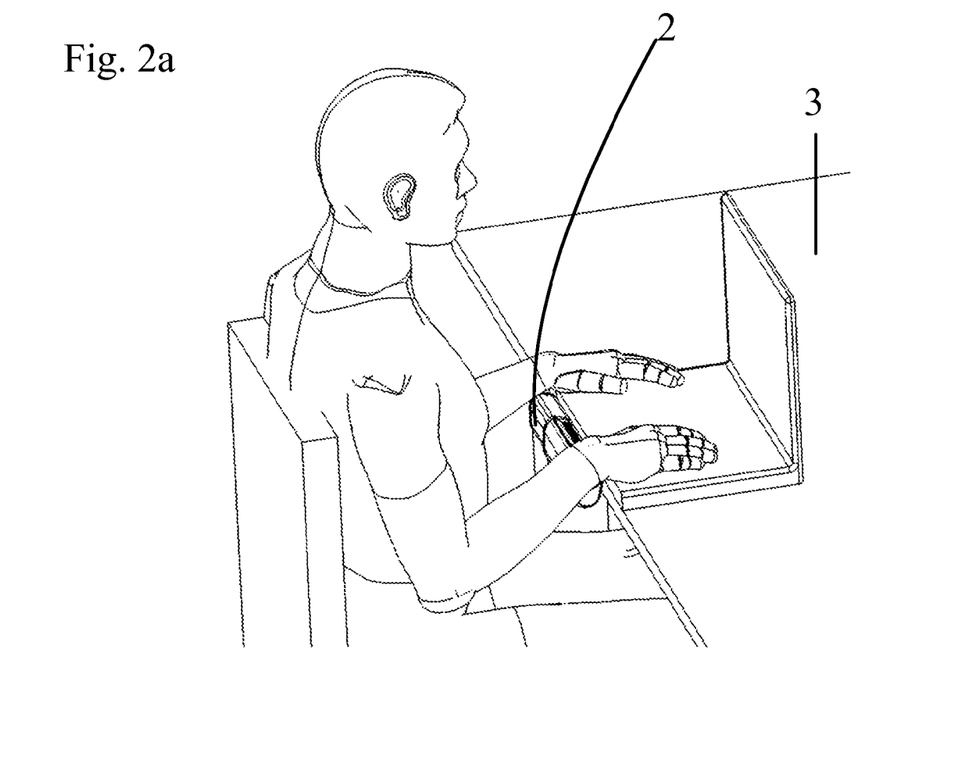
FIG. 2a shows a ventilation device of the present invention mounted on the front of a desk.
Figure 2B:
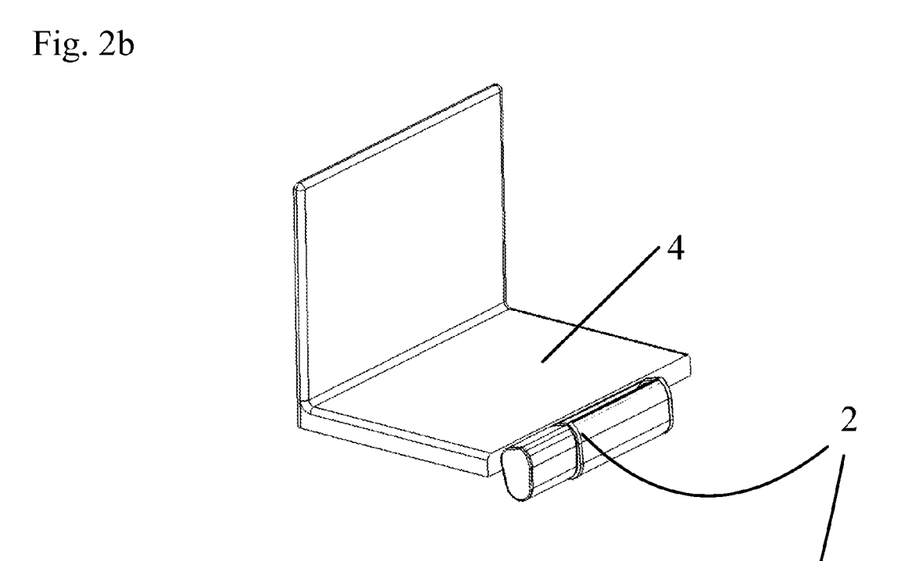
FIG. 2b shows a view of a ventilation device of the present invention mounted on the front of a laptop computer.
Figure 2C:
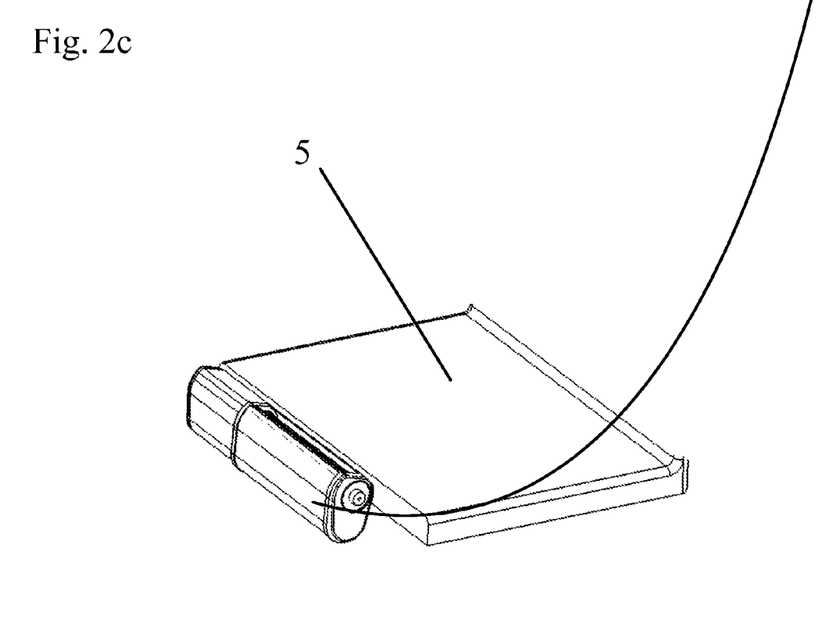
FIG. 2c shows a view of a ventilation device of the present invention mounted to the front of a serving tray on an airplane.
Figure 5:
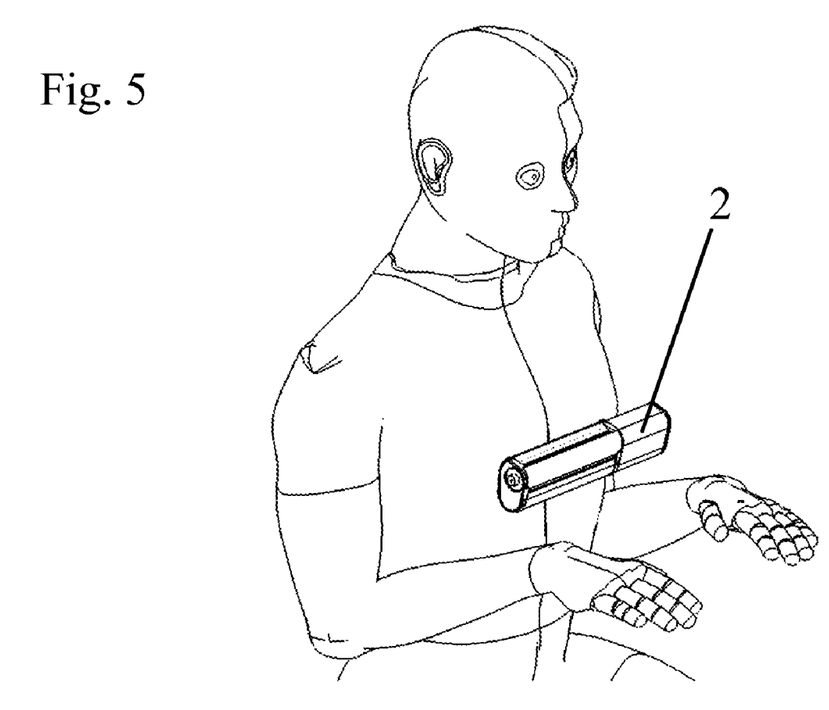
FIG. 5 shows a person wearing a ventilation device of the present invention.

This invention addresses the need for a compact, efficient, personal filtration device 2 to remove the contaminants present in the thermal plume before reaching the face. Some preferable mounting positions for the personal ventilation device are shown in FIGS. 2a-2c and include, but are not limited to, the front of a desk 3, the front of a laptop computer 4, or the serving tray 5 on an airplane. Other examples of applications include attaching the personal filtration device 2 to the steering column of a car and, in hospitals, on patients with compromised immune systems. FIG. 5 shows a user wearing a personal ventilation device 2 of the present invention.

Figure 4B:
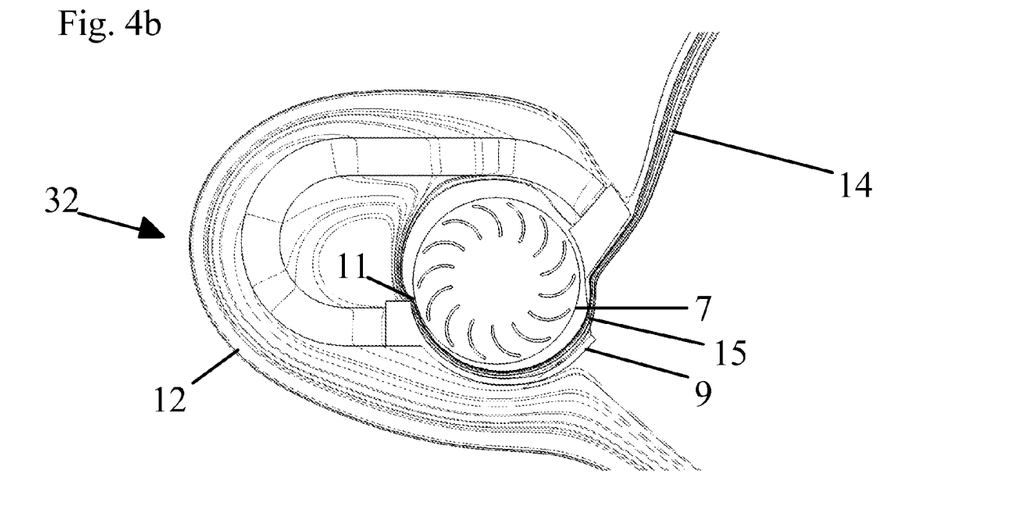
FIG. 4b shows a diagram of the flow path of a ventilation device of the present invention.

One embodiment of the personal filtration device 32 is shown in FIG. 4a and FIG. 4b. In this design, the cross-flow fan 6 and filter system 8 work in tandem to draw in air from the thermal plume 12, filter it, and then expel the air stream 14 to provide the breathed air to the individual.

The cross-flow fan 6 includes a rotor 7, a motor 46 (shown in FIG. 10b) and a cover 9 that surrounds the rotor 7 and has an inlet 11 and an outlet 15. The majority of the air breathed in by the individual will first be processed by the personal ventilation device 2, which will filter out a wide range of contaminants (e.g. gaseous, particulate, and micro-organisms). Proper intake of the thermal plume, and re-delivery of the filtered air to the user, provides a significant reduction in exposure to pollutants.

Figure 14:
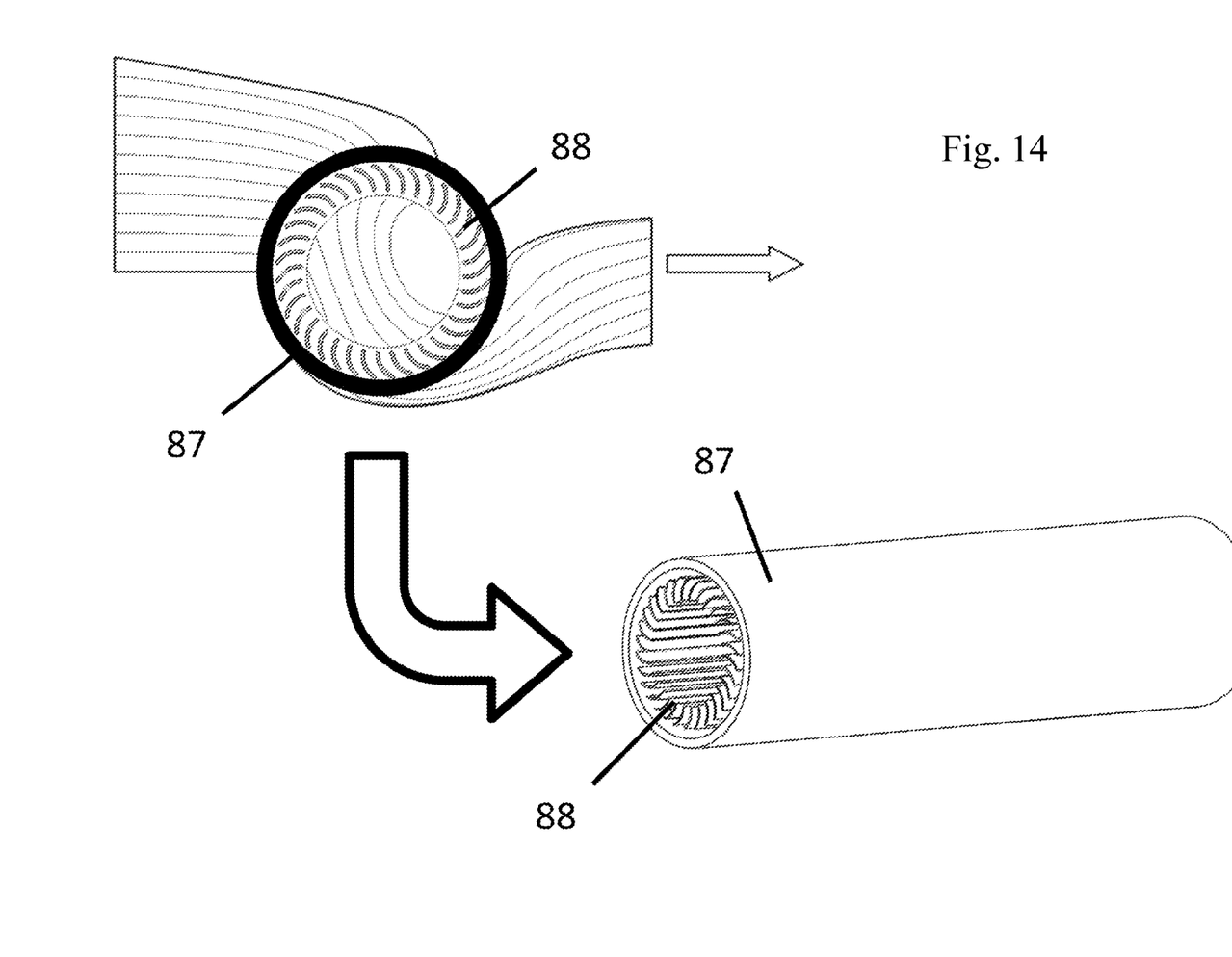
FIG. 14 shows an embodiment of the ventilation device, where the filter completely surrounds the fan.

FIG. 14 shows another embodiment of a personal ventilation device of the present invention that could be used in a personal ventilation device. The filter 87 in this figure fully surrounds the fan 88.

The filter(s) in the embodiments of the present invention may include any filter that effectively filters particles and/or other pollutants, including, but not limited to, volatile organic compounds (VOCs), microorganisms, and other undesired gases and airborne pollutants.

In one embodiment, the filter is preferably attached to a support structure such that the filter radially surrounds the fan, thereby forming a filter cartridge 33. In other embodiments, the fan can surround the filter segment depending on the fan configuration. In still other embodiments, the filter cartridge is shaped for the desired application without utilizing a fan for air movement.

Figure 6:
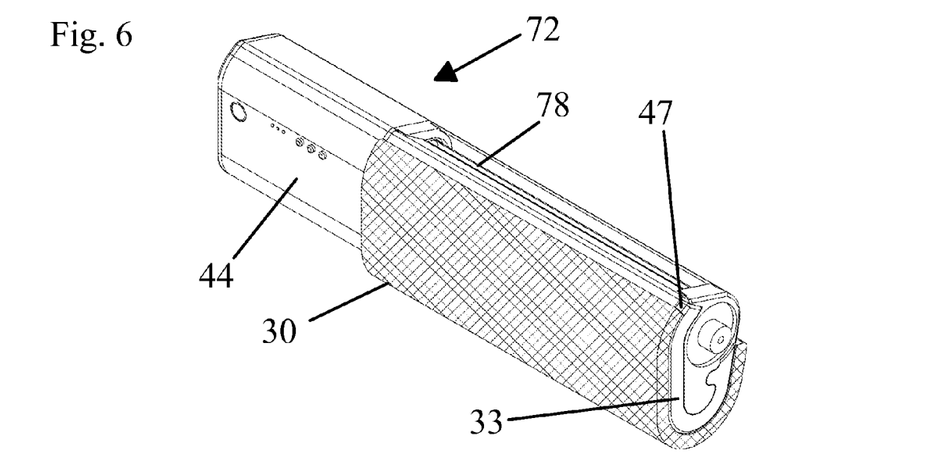
FIG. 6 shows a close-coupled heat-exchanger/filtration unit of the present invention.
Figure 7A:
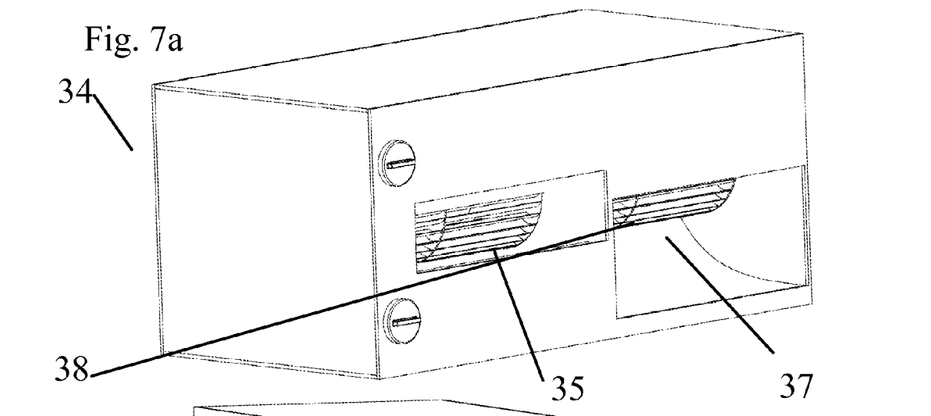
FIGS. 7a and 7b show perspective views of a ventilation device of the present invention using a segmented cross-flow fan.
Figure 7B:
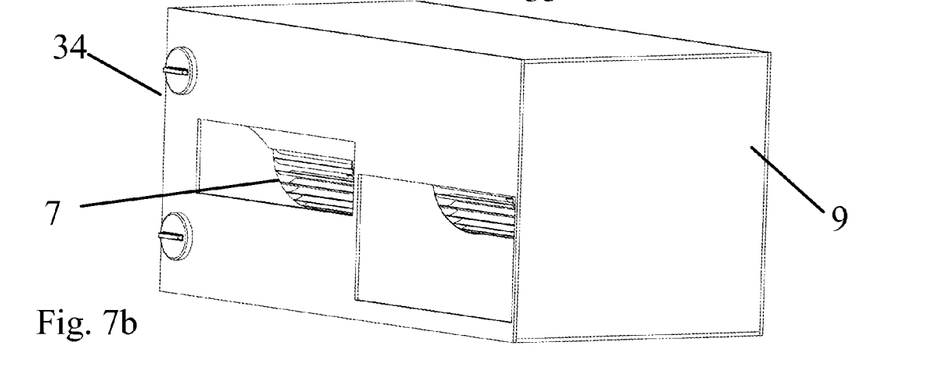
Figure 7C:
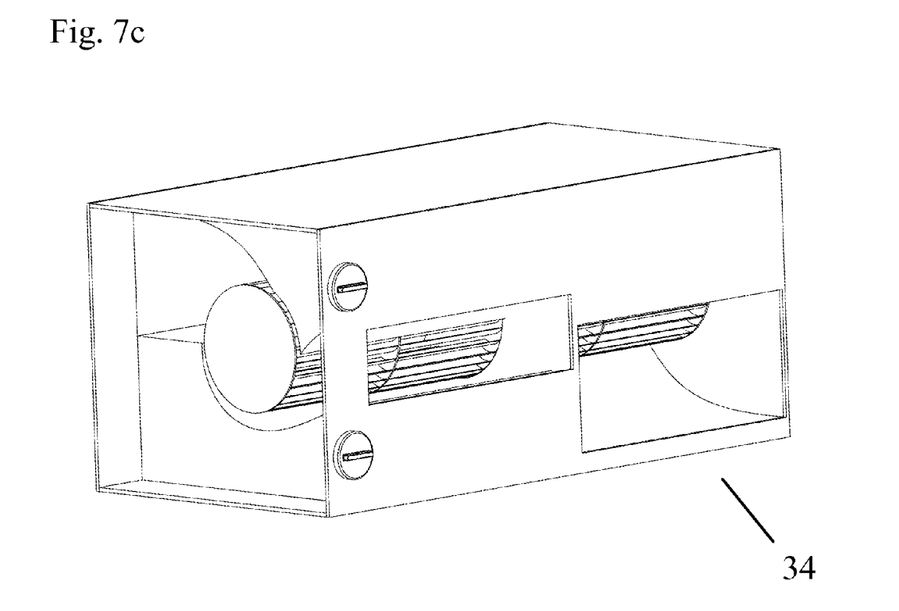
FIGS. 7c and 7d show perspective views of a ventilation device of the present invention using a segmented cross-flow fan from FIGS. 7a and 7b respectively, with the end cover removed.
Figure 7D:
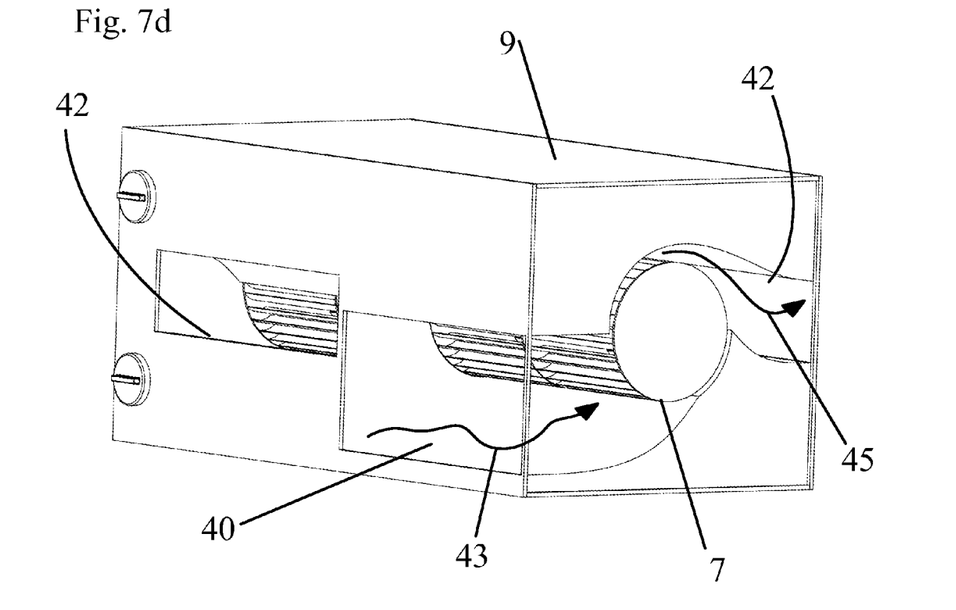

Another embodiment of a personal ventilation device 72 is shown in FIG. 6. This embodiment includes a filter 47 that is radially fitted around a fan 78 attached to a fan housing 44 and coupled to a power supply unit. The diameter of the fan 78 and overall length of the personal ventilation device 72 is determined by the intended application of the device and the area of the airspace to be filtered.

In FIG. 6, the filter 47 is fitted with a heat exchanger 30 such that the filtered air can be warmed or cooled for larger scale Heating Ventilation and Cooling (HVAC) units. Combining a heat exchanger with the filter and fan described herein creates a compact device in applications where minimum space is a design criteria. Since pressure losses in heat-exchangers are well known and easily calculated, such a system is easily designed by combining the resistances of the heat-exchanger and filter.

Figure 9:
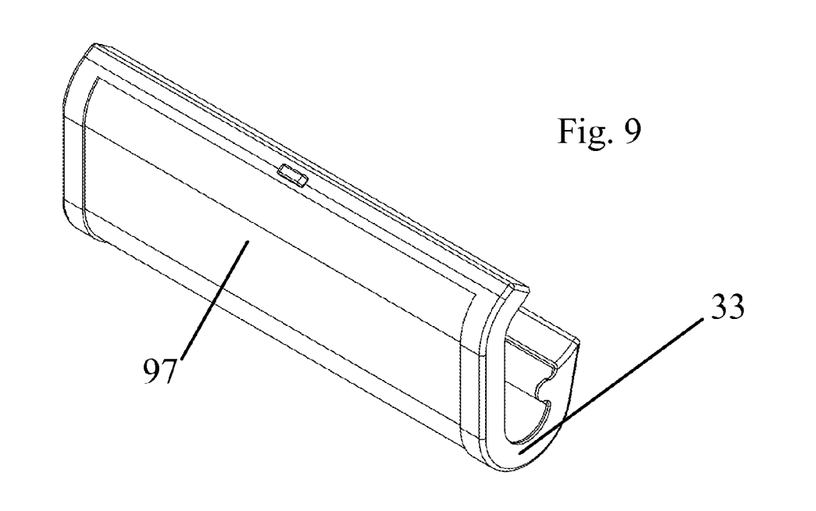
FIG. 9 shows a perspective view of a detached filter segment.
Figure 10A:
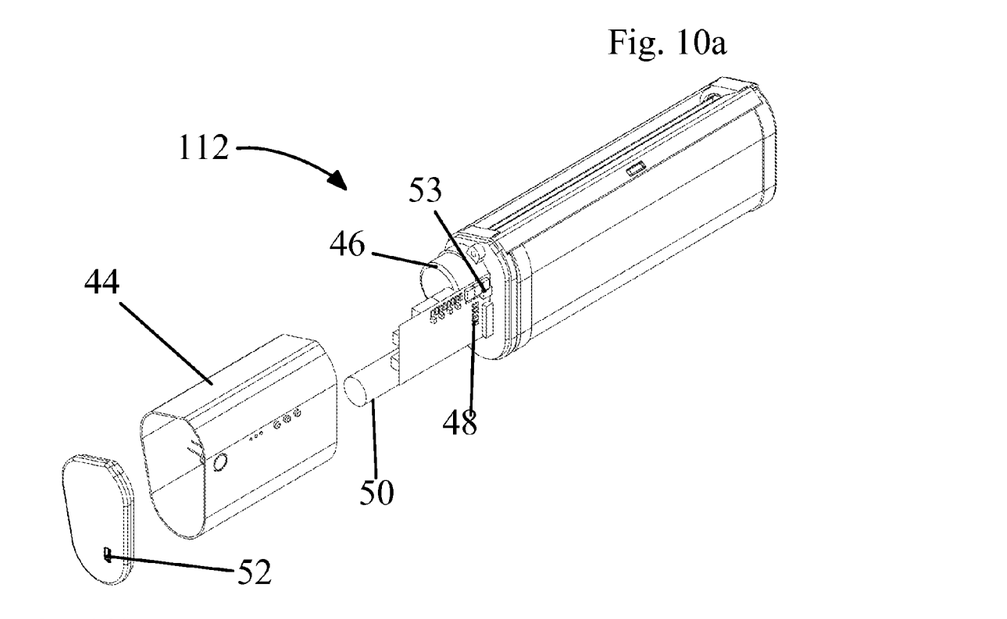
FIG. 10a shows a ventilation device in perspective view with the power supply segment disassembled.
Figure 10B:
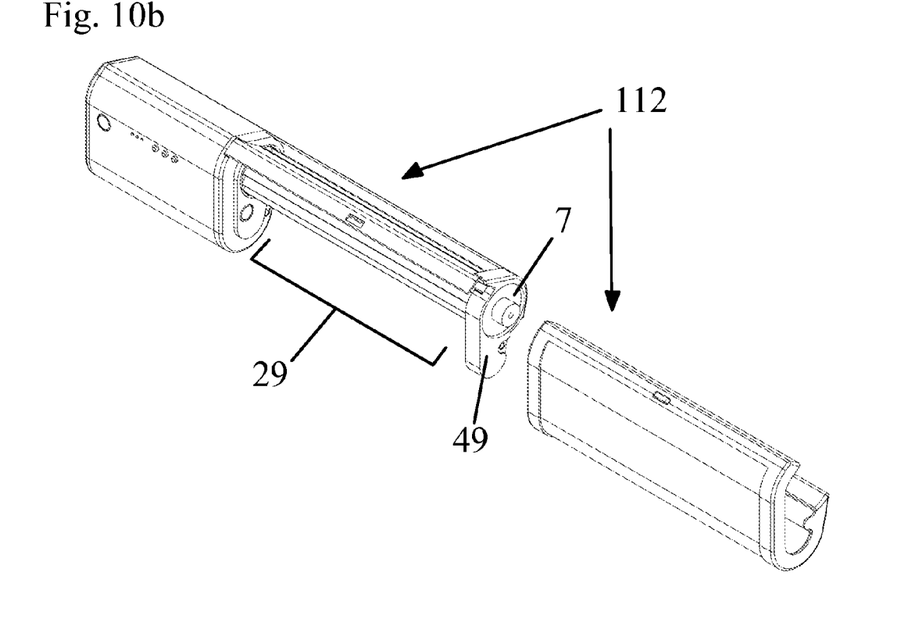
FIG. 10b shows a ventilation device in perspective view with the filter detached from the device.

One embodiment of the personal ventilation device 72 is designed with a filter cartridge 33 that is elongated, as shown in FIGS. 6, 9, and 10b. As shown in these figures, the filter cartridge has a partial elliptical, substantially J, or hook shape. Because the orbit of fans are usually circular, the filter can be elongated, having a more flattened or elliptical shape. This allows the filter to have more surface area than a perfect cylinder, but remain compact relative to the fan 78.

For ventilation systems where additional filtering surface area is desired, the filter cartridge 33 can wrap around the bottom and back-side of the fan. This allows for a smaller unit with equal or greater filtering capabilities than filters with a flat surface geometry. In FIGS. 10a and 10b, the filter in the personal ventilation device 112 is oriented such that exhausted air is filtered in a single stage. The ventilation device can alternatively be configured to filter air in multiple stages. For example, the filter 87 can completely surround the fan chamber 29 such that both air drawn in and exhausted by the fan 88 passes through the filter 87 while maintaining a high flow rate, as shown in FIG. 14. Alternatively, additional filters can be stacked if additional layers increasing the filtering capability are desired.

In a preferred embodiment of the present invention, the fan is a radially mounted, segmented cross-flow fan 34, as shown in. FIGS. 7a-7d. In conventional prior art configurations, air flows in through one inlet and out of one outlet, and hence flows only in one direction. In contrast, the segmented cross-flow fan 34 is divided into two segments 35, 37 by a divisional wall 38 such that each segment 35, 37 of the fan 34 connects to a common axel. While only two segments 35, 37 are shown in this figure, the device may have three or more segments without deviating from the spirit of the present invention. The inlet channels 40 and output channels 42 are shaped internally (not shown) such that when the segmented cross-flow fan 34 rotates, air is exhausted through the output channels 42 in any specified direction even though the fan only rotates in one direction. The air coming in and the air coming out are depicted by arrows 43 and 45, respectively, in FIG. 7d.

The internal housing is designed such that, through any individual fan segment, the flow path is fabricated to promote airflow in either direction. That is, the inlet and outlet of the unit is defined by the internal flow path structure. An advantage of the segmented, cross-flow fan 34 is that, by using only one fan spinning in a single direction, multiple airflow paths can be setup, whereby the air is flowing in several different directions.

Figure 8A:
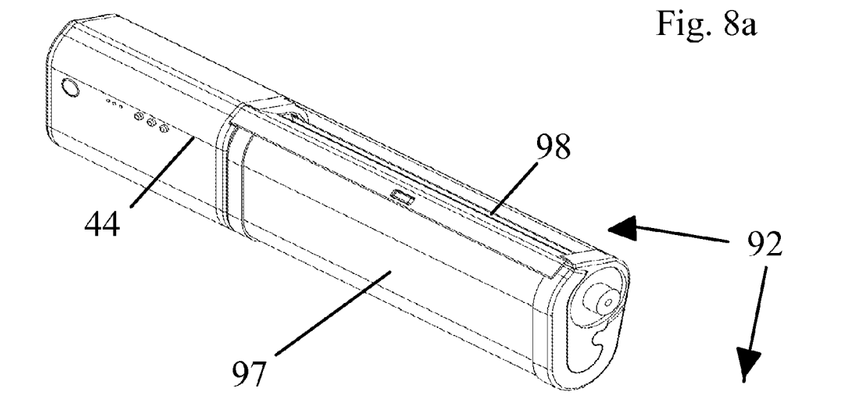
FIGS. 8a and 8b show perspective views of a personal ventilation device.
Figure 8B:
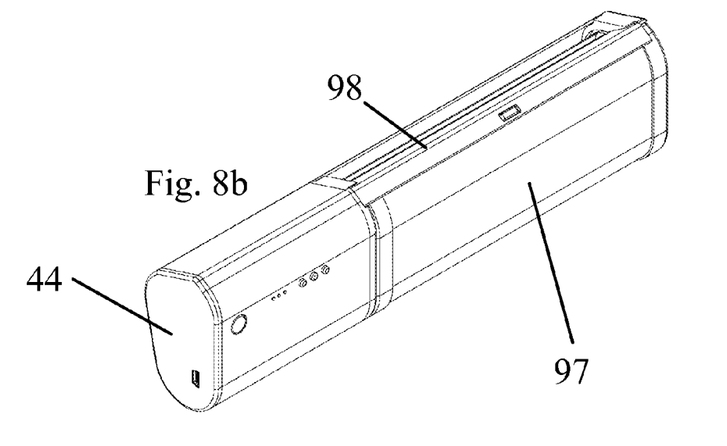

FIGS. 8a, 8b, and 9 show another preferred embodiment of a personal ventilation device 92 with the filter 97 attached to the fan housing 44 (FIGS. 8a and 8b) and the filter by itself (FIG. 9). The fan housing 44 includes the fan 98 that is supported at one end by an end plate 49. The fan is coupled to a motor 46 as shown in FIGS. 10a and 10b. The motor 46 preferably attaches electrically or mechanically to a control unit interface 48. The fan housing 44 includes a power supply input jack 52 that electrically attaches to a power supply 50 that can recharge through a USB type connection. Alternatively, the power supply 50 can be charged or powered by alternate current and direct current connections. In one embodiment, a pulse-width modulation motor 46 is powered by the power supply 50 such that the control interface 48 allows the user to adjust settings for the ventilation device. Alternatively, the fan speed can be controlled by a standard linear controller. Manual control buttons 53 linked to the control interface 48 control the fan speed. Alternatively, the device can be modulated and monitored by software though a USB type connection. Multiple VOC and temperature sensors can be included and monitored simultaneously on either the computer or on a readout on the personal ventilation device.

Figure 11:
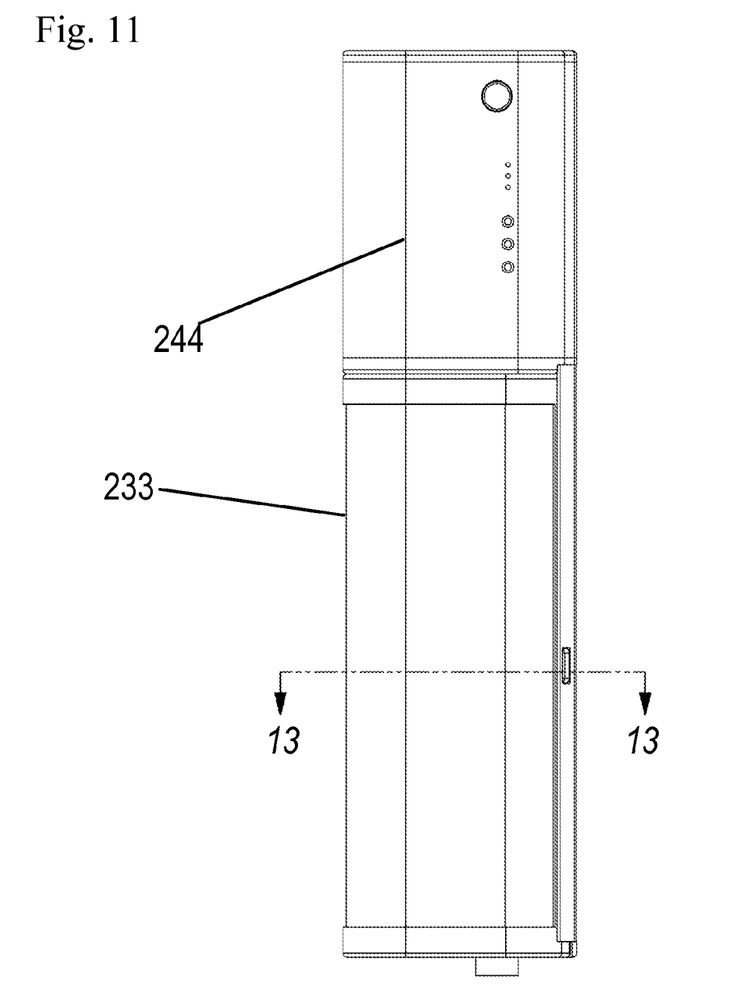
FIG. 11 shows a front view of a ventilation device of the present invention.
Figure 12:
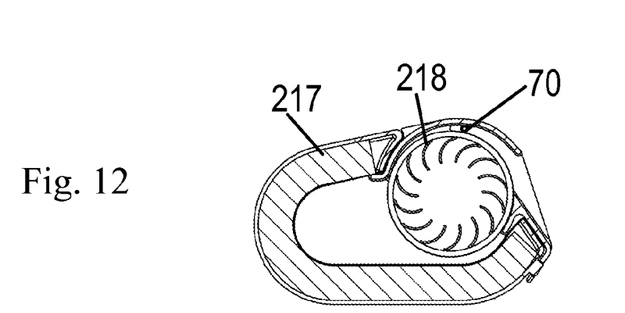
FIG. 12 shows a cross section of the ventilation device of FIG. 11.

In FIG. 11, a filter cartridge 233 is attached to a fan housing 244. FIG. 12 shows the filter 217 surrounding the fan 218 such that its elongated form yields greater surface area than if more closely conformed to the circular nature of the fan 218.

Figure 13A:
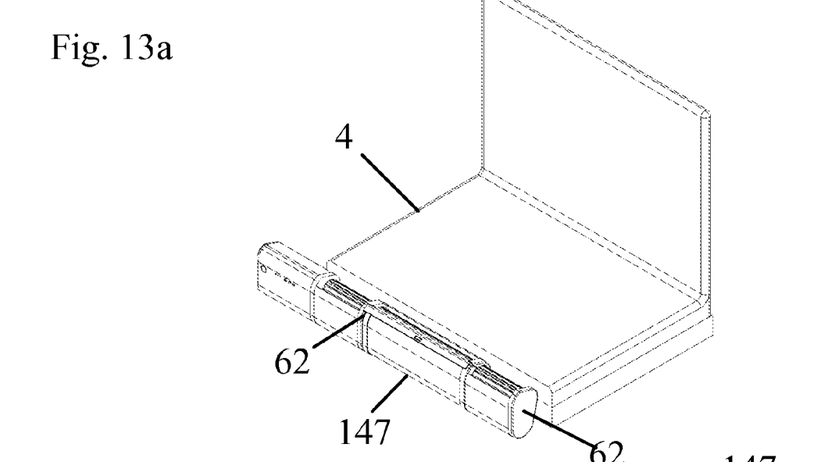
FIGS. 13a-13c shows perspective views of a ventilation device of the present invention having a segmented cross-flow fan and Peltier junction air cooler/warmer.
Figure 13B:
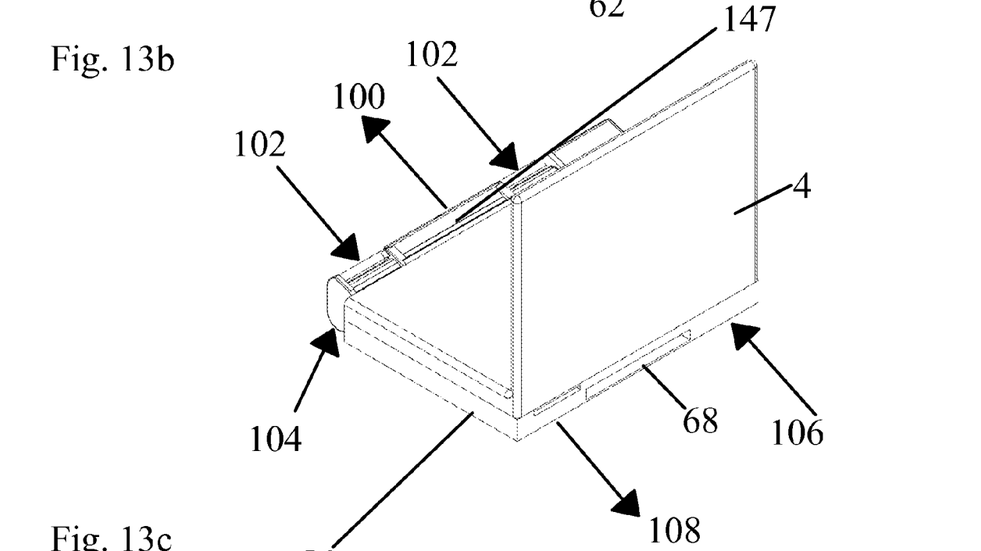
Figure 13C:
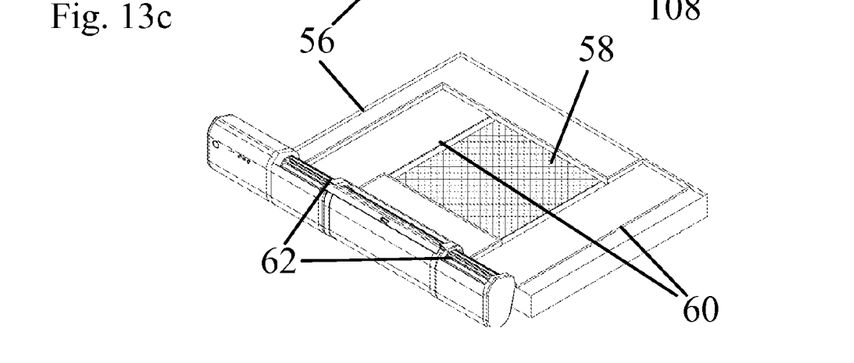

FIGS. 13a-13c show the ventilation device adapted to a laptop computer 4. In a preferred embodiment, the ventilation device is joined with a Peltier junction or thermoelectric cooling device 58. A case 56 holds the device 58. The Peltier junction 58 includes at least two electrically charged plates stacked on top of one another. The charged plates include a cold exchanger that absorbs warm temperature and a heat exchanger that dissipates warm temperature. Air flow channels 60 direct the warm air out the back of the laptop computer 4. This embodiment of the invention can be configured to include a filter 147, and fan segments 62 that adhere to the same principles shown in FIGS. 7a-7d.

The segmented cross-flow personal ventilation device includes a cross-flow fan that is divided into segments 62 such that warm air is convected away from the laptop 4 through vents 68, and cooler air is directed through the filter 147 simultaneously. Note that there is a segment 62 (not shown) of the fan surrounded by the filter 147 in the central portion of the device. Conversely, the airflow patterns can be reversed by altering the current of the Peltier junction such that the warm air is convected through the filter 147 toward the individual and cooler air is convected away from the laptop through the vents 68.

As shown in FIG. 13b, using a segmented cross-flow fan with fan segments 62 will allow, given only one fan, air to be delivered both toward 100 and away 102 from the individual. The air 104 from the thermal plume enters the center fan partition of the personal ventilation device. Through careful thermal-fluid management, this embodiment can provide cooled air 100 to the user, while simultaneously evacuating the warmed air 102 in the opposite direction, away from the user. In the back of the laptop computer 4, warm air 106 is pulled into the cooler unit, while hot air 108 is blown out the back of the unit. Ducting within the Peltier cooling unit, located under the laptop, brings chilled air into the center cross-flow fan, through the filter, and out to the individual. The outer fan sections 62 draw in air from the top in order to convect the heat generated from the Peltier junction and laptop out the back.

In one embodiment, scented air fragrances may be added to the filtered air. In one example, scented fabric can be adapted to cover the exhaust layer of the filter thereby emitting a scent into the air. In another embodiment, the ventilation device can have injectors 70 (see FIG. 12) that emit a chemical into the air as it passes through the filter or at some point after the air passes through the filter.

Many commercial applications exist for the personal ventilation system. As discussed above, in one embodiment, the unit will attach directly to a laptop computer or office desk to provide a personal workspace with active filtration. In other embodiments, the device will be wearable in situations where the user is sitting, especially for long periods of time, for example on an airplane, train, or while driving a car during rush-hour traffic. The device will supply fresh air to the individual in these situations, reducing exposure to a wide variety of contaminants. In schools, this system will provide needed relief for children with allergies or asthma. In hospitals, those with reduced or compromised immune systems will benefit from the reduction of inhaled pathogens and other pollutants, which may speed recoveries by reducing secondary infection transmission.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A personal ventilation device for filtering contaminants out of air, comprising:
   a) a cross-flow fan comprising a motor, a rotor having plurality of fan blades, and a cover surrounding the rotor and having an inlet and an outlet;
   b) at least one curved air filter at least partially surrounding the rotor such that air that enters into the personal ventilation device passes through both the fan and the air filter before exiting the personal ventilation device.

2. The personal ventilation device of claim 1, wherein the filter completely surrounds the rotor such that air that enters the personal ventilation device passes through the filter at least twice and passes through the fan blades at least twice before exiting the personal ventilation device.

3. The personal ventilation device of claim 1, wherein the cover of the cross-flow fan has at least two axial segments, wherein each segment is shaped such that each segment can intake air from the input and exhaust air from the output.

4. The personal ventilation device of claim 3, further comprising:
   a) a platform for supporting a laptop computer comprising a thermoelectric cooler for cooling the laptop computer and modulating air flow temperature, wherein at least one of the axial segments of the cover of the fan routes air to or from the thermoelectric cooler; and
   b) a power supply for the fan and the thermoelectric cooler.

5. The personal ventilation device of claim 1, further comprising a bracket for attaching the personal ventilation device to an object.

6. The personal ventilation device of claim 1, wherein the device is wearable by an individual.

7. The personal ventilation device of claim 1, wherein the device further comprises a heat exchanger at least partially surrounding the filter.

8. The personal ventilation device of claim 1, further comprising a fragrance dispenser that adds fragrance to air that exits the personal ventilation device.

9. The personal ventilation device of claim 1, wherein the personal ventilation device has an outlet air velocity between 0.5 m/s and 1.0 m/s.

10. The personal ventilation device of claim 1, wherein the personal ventilation device exhausts air out of the device at an exhaust angle between 30 and 45 degrees from horizontal.

11. The personal ventilation device of claim 1, further comprising a plurality of sensors that monitor temperature and VOC concentration in the air.

12. The personal ventilation device of claim 1, further comprising a first filter located at the inlet of the fan and a second filter located at the outlet of the fan.

13. The personal ventilation device of claim 1, wherein at least one filter comprises at least one filter material that targets filtration of a specific contaminant.

14. The personal ventilation device of claim 1, further comprising a motor controller coupled to the motor and having an input for coupling to an external device that controls the motor.

15. The personal ventilation device of claim 1, wherein the filter is substantially J-shaped.

16. A single cross-flow fan comprising:
   a) a motor;
   b) a rotor having plurality of fan blades; and
   c) a housing surrounding the rotor and having:
      i) at least two inlets;
      ii) at least two outlets; and
      iii) at least two adjacent axial segments, wherein the cross-flow fan rotates only in one direction, and wherein the adjacent segments are shaped such that air flows in more than one direction.

17. A personal ventilation device for filtering contaminants out of air, comprising:
   a) a cross-flow fan comprising a motor, a rotor having plurality of fan blades, and a cover surrounding the rotor and having an inlet and an outlet;
   b) at least one filter that completely surrounds the rotor such that air that enters the personal ventilation device passes through the filter at least twice and passes through the fan blades at least twice before exiting the personal ventilation device.

18. A personal ventilation device for filtering contaminants out of air, comprising:
   a) a cross-flow fan comprising a motor, a rotor having plurality of fan blades, and a cover surrounding the rotor and having at least two inlets and at least two outlets, wherein the cover of the cross-flow fan has at least two adjacent axial segments, wherein the cross-flow fan rotates only in one direction, and wherein the adjacent segments are shaped such that air flows in more than one direction;
   b) a platform for supporting a laptop computer comprising a thermoelectric cooler for cooling the laptop computer and modulating air flow temperature, wherein at least one of the axial segments of the cover of the fan routes air to or from the thermoelectric cooler; and
   c) a power supply for the fan and the thermoelectric cooler.

19. The personal ventilation device of claim 18, further comprising:

d) at least one air filter at least partially surrounding the rotor such that air that enters into the personal ventilation device passes through both the fan and the air filter before exiting the personal ventilation device.

20. A personal ventilation device for filtering contaminants out of air, comprising:
   a) a cross-flow fan comprising a motor, a rotor having plurality of fan blades, and a cover surrounding the rotor and having an inlet and an outlet;
   b) at least one air filter at least partially surrounding the rotor such that air that enters into the personal ventilation device passes through both the fan and the air filter before exiting the personal ventilation device; and
   c) a bracket for attaching the personal ventilation device to an object.

21. A personal ventilation device for filtering contaminants out of air, comprising:
   a) a cross-flow fan comprising a motor, a rotor having plurality of fan blades, and a cover surrounding the rotor and having an inlet and an outlet; and
   b) at least one air filter at least partially surrounding the rotor such that air that enters into the personal ventilation device passes through both the fan and the air filter before exiting the personal ventilation device;
   wherein the device is wearable by an individual.

22. A personal ventilation device for filtering contaminants out of air, comprising:
   a) a cross-flow fan comprising a motor, a rotor having plurality of fan blades, and a cover surrounding the rotor and having an inlet and an outlet;
   b) at least one air filter at least partially surrounding the rotor such that air that enters into the personal ventilation device passes through both the fan and the air filter before exiting the personal ventilation device; and
   c) a heat exchanger at least partially surrounding the filter.

23. A personal ventilation device for filtering contaminants out of air, comprising:
   a) a cross-flow fan comprising a motor, a rotor having plurality of fan blades, and a cover surrounding the rotor and having an inlet and an outlet;
   b) a first filter at least partially surrounding the rotor such that air that enters into the personal ventilation device passes through both the fan and the air filter; and
   c) a second filter located at the outlet of the fan.

* * * * *